US006842504B2

(12) United States Patent
Mills et al.

(10) Patent No.: US 6,842,504 B2
(45) Date of Patent: Jan. 11, 2005

(54) SYSTEM AND METHOD FOR THE AUTOMATED ANALYSIS OF PERFORMANCE DATA

(75) Inventors: Scott H. Mills, Austin, TX (US); Kurt M. Joseph, Austin, TX (US); Theodore B. Pasquale, Austin, TX (US); Robert R. Bushey, Cedar Park, TX (US); John M. Martin, Austin, TX (US); Benjamin A. Knott, Round Rock, TX (US)

(73) Assignee: SBC Properties, L.P., Reno, NV (US)

( * ) Notice: Subject to any disclaimer, the term of this patent is extended or adjusted under 35 U.S.C. 154(b) by 193 days.

(21) Appl. No.: 10/217,863

(22) Filed: Aug. 13, 2002

(65) Prior Publication Data

US 2004/0032935 A1 Feb. 19, 2004

(51) Int. Cl.[7] .............................................. H04M 3/22
(52) U.S. Cl. ..................................... 379/67.1; 379/10.1
(58) Field of Search ............................ 379/1.02, 10.01, 379/10.02, 10.03, 27.03, 29.02, 29.1, 67.1, 88.11, 88.24

(56) References Cited

U.S. PATENT DOCUMENTS

| | | | |
|---|---|---|---|
| 4,930,077 A | 5/1990 | Fan | 364/419 |
| 5,371,673 A | 12/1994 | Fan | 364/419.01 |
| 5,633,909 A | 5/1997 | Fitch | 379/15 |
| 5,671,351 A | 9/1997 | Wild et al. | 395/183.14 |
| 5,822,397 A * | 10/1998 | Newman | 379/27.02 |
| 5,835,565 A * | 11/1998 | Smith et al. | 379/27.04 |
| 5,873,068 A | 2/1999 | Beaumont et al. | 705/14 |
| 5,905,774 A | 5/1999 | Tatchell et al. | 379/88.04 |
| 5,963,965 A | 10/1999 | Vogel | 707/501 |
| 5,999,611 A | 12/1999 | Tatchell et al. | 379/211 |
| 6,032,129 A | 2/2000 | Greef et al. | 705/27 |
| 6,035,283 A | 3/2000 | Rofrano | 705/27 |
| 6,038,560 A | 3/2000 | Wical | 707/5 |
| 6,058,435 A | 5/2000 | Sassin et al. | 709/305 |
| 6,160,877 A | 12/2000 | Tatchell et al. | 379/197 |
| 6,230,197 B1 | 5/2001 | Beck et al. | 709/223 |
| 6,243,375 B1 | 6/2001 | Speicher | 370/352 |
| 6,249,579 B1 | 6/2001 | Bushnell | 379/356 |
| 6,289,084 B1 | 9/2001 | Bushnell | 379/67.1 |
| 6,292,909 B1 | 9/2001 | Hare | 714/40 |
| 6,308,172 B1 | 10/2001 | Agrawal et al. | 707/5 |
| 6,349,290 B1 | 2/2002 | Horowitz et al. | 705/35 |
| 6,357,017 B1 | 3/2002 | Bereiter et al. | 714/27 |
| 6,366,879 B1 | 4/2002 | Coxhead et al. | 704/201 |
| 6,374,260 B1 | 4/2002 | Hoffert et al. | 707/104.1 |
| 6,400,807 B1 * | 6/2002 | Hewitt et al. | 379/88.11 |
| 6,405,149 B1 * | 6/2002 | Tsai et al. | 702/119 |
| 6,405,170 B1 | 6/2002 | Phillips et al. | 704/270 |
| 6,516,051 B2 * | 2/2003 | Sanders | 379/10.03 |
| 6,598,022 B2 * | 7/2003 | Yuschik | 704/275 |

OTHER PUBLICATIONS

U.S. patent application Publication No. US 2001/0011211 dated Aug. 2, 2001 for U.S. patent application Ser. No. 09/089,403 filed Jun. 3, 1998 by Robert R. Bushey et al. and entitled "A Method For Categorizing, Describing, and Modeling Types of System Users." Assignee—SBC Technology Resources, Inc.

(List continued on next page.)

Primary Examiner—Scott L. Weaver
(74) Attorney, Agent, or Firm—Baker Botts L.L.P.

(57) ABSTRACT

A method and system for automating the analysis of performance data includes an analysis system automatically analyzing a plurality of performance data sets, a task engine, and a score engine. The task engine allows for the matching of each performance data set with an assigned task for each performance data set and the retrieval of a correct key sequence for each performance data set. The score engine compares the correct key sequence with a recorded key sequence of the performance data set to determine if the assigned task is successfully accomplished. The score engine further calculates one or more response times for each performance data set. The automated analysis of per formance data allows for a cost savings, more efficient use of time, and more reliable and consistent performance data analysis results.

41 Claims, 4 Drawing Sheets

OTHER PUBLICATIONS

U.S. patent application Publication No. US 2001/0014863 dated Aug. 16, 2001 for U.S. patent application Ser. No. 09/748,729 filed Dec. 26, 2000 by Lawrence E. Williams, III and entitled "*Method and System For Providing Life Management and Enhancement Applications and Services For Telematics and Other Electronic Medium.*".

U.S. patent application Publication No. US 2002/0055868 dated May 9, 2002 for U.S. patent application Ser. No. 09/862,637 filed May 22, 2001 by Angela G. Dusevic et al. and entitled "*System and Method For Providing a Task-Centric Online Environment.*".

U.S. patent application Ser. No. 10/188,152 filed Jul. 2, 2002 by Scott H. Mills et al. and entitled "*Method and System for Automated Categorization of Statements*".

U.S. patent application Ser. No. 10/230,708 filed Aug. 29, 2002 by Benjamin A. Knott et al. and entitled "*Method, System and Apparatus for Providing an Adaptive Persona in Speech–Based Interactive Voice Response Systems*".

U.S. Continuation–in–Part patent application Ser. No. 10/217,873 filed Aug. 13, 2002 by Bushey et al. and entitled "*Method for Automating the Creation of Customer–Centric Interfaces*".

U.S. patent application Publication No. US 2002/0073360 dated Jun. 13, 2002 for U.S. patent application Ser. No. 09/244,895 filed Feb. 4, 1999 by Bradley Lewis et al. and entitled "*Method, Systems, and Articles of Manufacture For Analyzing Performance of Application Programs.*".

\* cited by examiner

SYSTEM AND METHOD FOR THE AUTOMATED ANALYSIS OF PERFORMANCE DATA

TECHNICAL FIELD OF THE INVENTION

The present invention relates generally to information processing and management, and more specifically relates to a method and system for the automated analysis of performance data.

BACKGROUND OF THE INVENTION

Every year, companies typically receive numerous telephone calls from customers seeking assistance with particular tasks. The customers often speak with customer service representatives (CSR) to complete their tasks. But because of the cost associated with CSR time, companies are switching over to automated systems such as interactive voice response (IVR) systems where IVR systems answer the customer phone calls and direct the customer phone calls to the correct service center. The IVR systems allow customers to complete their tasks without the assistance of a CSR. In order to maintain a high level of customer satisfaction, an IVR system must be designed so that customers can easily navigate the various menus and accomplish their tasks without spending too much time on the telephone and becoming frustrated and unsatisfied with the company and its services. Therefore, companies must design and continually test, update, and improve the IVR systems including the IVR menus so that the IVR systems function efficiently so that customers remain satisfied with the level of customer service.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention are illustrated in the figures, like numerals being used to refer to like and corresponding parts of the various drawings.

Many companies that have customer service programs and/or call centers, such as telephone companies, Internet service providers, and credit card companies, typically have automated systems such as interactive voice response (IVR) systems that answer and direct customer phone calls when a customer calls seeking assistance for a particular task such as to change an address or inquire about payment of a bill. If a customer does not reach an IVR system when calling a service number, the customer may speak with a customer service representative (CSR) who either helps the customer or transfers the customer to an IVR. Within the IVR, the customer listens to one or more prerecorded menus or prompts and provides responses using either touch-tone input or speech input in order to accomplish their task. Therefore, the content and structure of the prerecorded menus or prompts needs to allow for a customer to easily and quickly accomplish their task with little frustration.

In order for IVR systems to meet customers' needs, the usability of IVR systems are tested and improved by conducting laboratory studies or tests where test participants are asked to accomplish sets of tasks using an IVR system. An example of a task to accomplish may be, "Call Telephone Company at 555-1111 and change your billing address." In these studies or tests, the participants use telephones to interact with an IVR simulation application which is presented by a laboratory computer. The simulated IVR application plays prerecorded announcements or prompts to the participants in the form of a series of menus and records information regarding the participants' responses such as the menu name, the amount of time the prerecorded prompt played before the participant made a selection or pressed a key, and the key that the participant pressed. Once the study is completed, the recorded information regarding the participants' responses or the performance data is compiled into a log file with information regarding each task test stored as an individual performance data set.

To analyze the performance data collected by the IVR simulation application in the log file, the company may score participants call routing performance based on two factors—accomplishment of the task and the time spent in the IVR simulation application attempting to accomplish the task. Analysis of the log file and performance data is typically done as a manual process where one or more persons manually examine each performance data set noting the task, determining if the participant accomplished the task, and calculating the time spent listening to the menus or prompts and then manually creating an output file containing the findings of the IVR simulation. Given that a typical IVR study generally includes many participants each performing several different tasks, the manual analysis of the performance data is a very time consuming, labor intensive, and resource intensive process. In addition, the manual analysis of the performance data is also subject to human error such as math errors in calculating time spent in the menus and in omitting particular data points.

By contrast, the example embodiment described herein allows for the automated analysis of performance data. Additionally, the example embodiment allows for the consistent analysis of performance data free of human error. Time and money is saved because employees no longer manually examine the performance data determining if the task was accomplished and manually calculating the time required to accomplish each task. Therefore, employees' time may be better utilized in other revenue generating projects since less time is required to analyze the performance data. Furthermore, the analysis of the performance data is more reliable because the analysis is not subject to human error such as calculation errors and different people are not interpreting the performance data in different manners.

Figure 1:
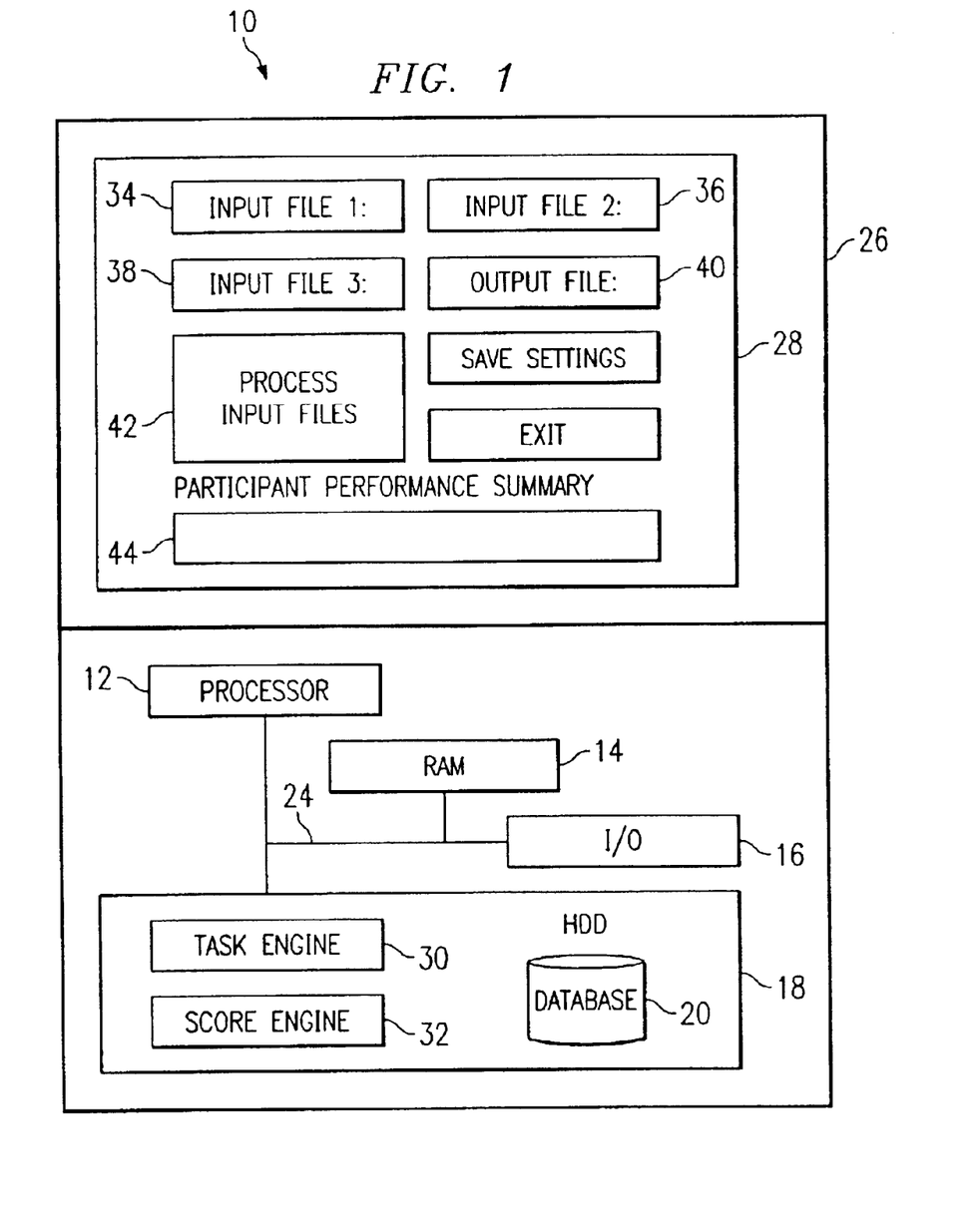
FIG. 1 depicts a block diagram of a system for automating the analysis of performance data.

Referring now to FIG. 1, a block diagram depicts analysis system 10 for automating the analysis of performance data. In the example embodiment, analysis system 10 may include respective software components and hardware components, such as processor 12, memory 14, input/output ports 16, hard disk drive (HDD) 18 containing database 20, and those components may work together via bus 24 to provide the desired functionality. The various hardware and software components may also be referred to as processing resources.

Analysis system 10 may be a personal computer, a server, or any other appropriate computing device. Analysis system 10 may further include display 26 for presenting graphical user interface (GUI) 28 and input devices such as a mouse and a keyboard. Analysis system 10 also includes task engine 30 and score engine 32, which reside in memory such as hard disk drive 18 and are executable by processor 12 through bus 24. Display 26 presents GUI 28 which allows for the selection of the log files for analysis system 10 to automatically analyze and for the presentation of some of the analysis results. Shown in FIG. 1 is an example GUI 28 with GUI 28 illustrated in greater detail in FIG. 2. GUI 28 includes a plurality of screens and buttons that allow the user to access and control the operation of analysis system 10, task engine 30, and score engine 30.

Analysis system 10 allows for the automated analysis of one or more log files containing performance data and the generation of an output file including the results of the analysis on the performance data. Although the example embodiment is described in reference to IVR performance data, in alternate embodiments analysis system 10 may also automatically analyze performance data from other systems in addition to IVR systems as well as any other appropriate type of data.

Figure 4:
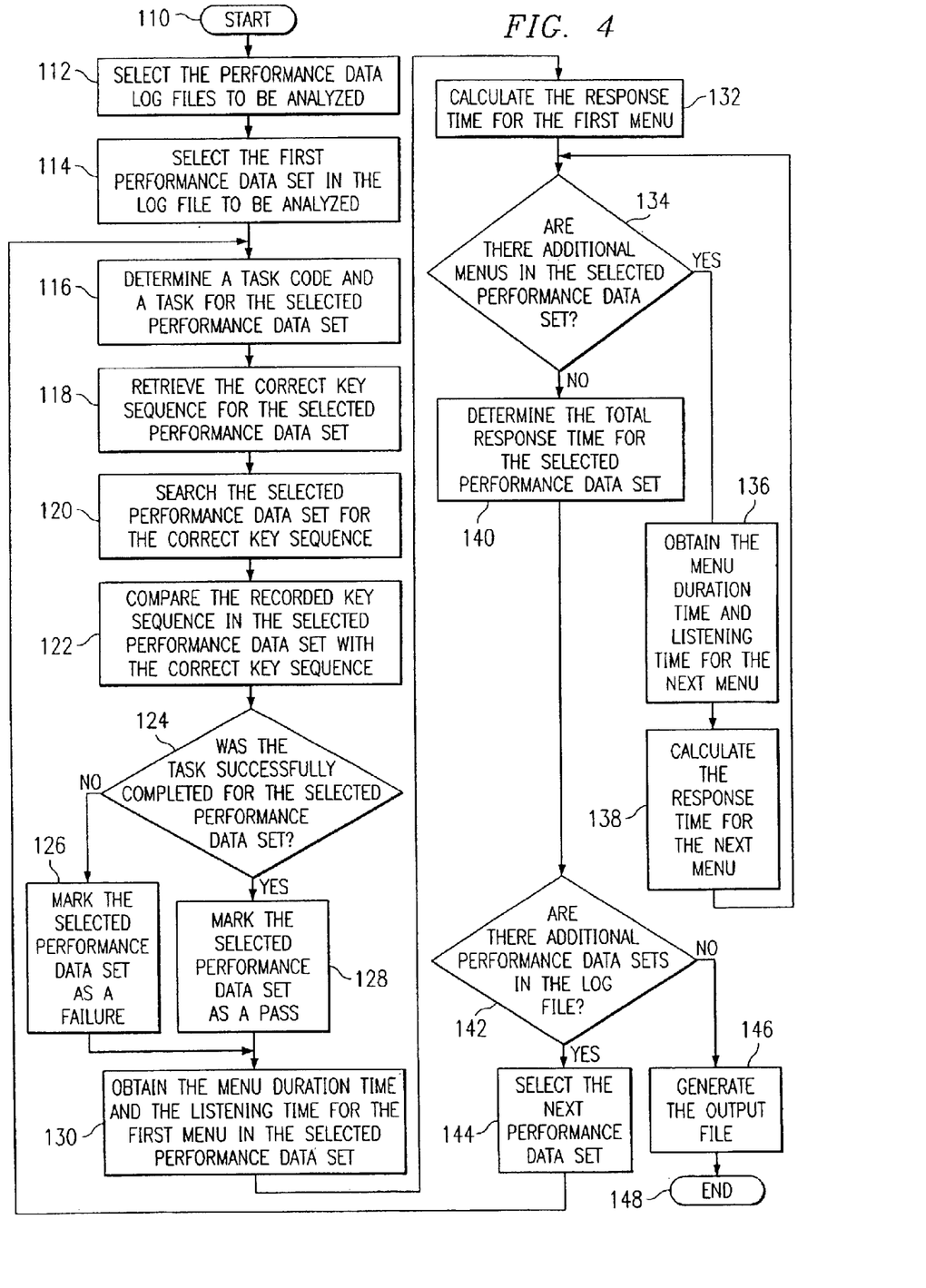
FIG. 4 illustrates a flow diagram of a method for the automated analysis of performance data.

FIG. 4 depicts a flow diagram of a method for the automated analysis of performance data. The method begins at step 110 and at step 112 a user of analysis system 10 selects the performance data to be analyzed. Analysis system 10 allows for up to three different log files to be analyzed at one time. In alternate embodiments, analysis system 10 may analyze more than three log files at the same time. Each time an IVR study or test occurs, a log file containing performance data from that test is created. So if there are three IVR tests in one day—one in the morning, one in the afternoon, and one in the evening—then there will be three log files at the end of the day. Analysis system 10 and GUI 28 allows for simultaneous analysis of the three log files at the same time to allow for more efficient operation of analysis system 10.

Figure 2:
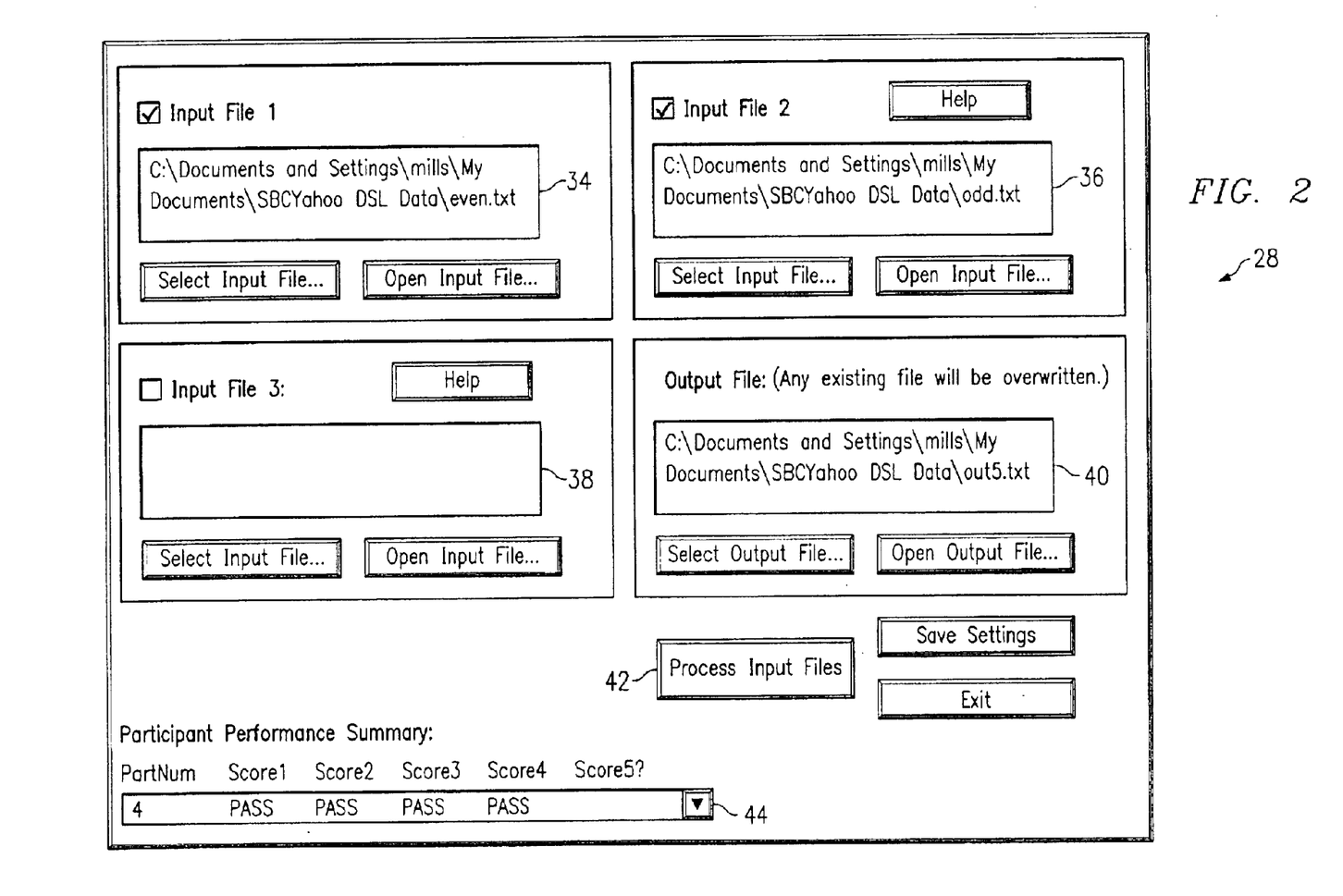
FIG. 2 illustrates an example graphical user interface.

To analyze more than one log file at a time, the user selects the log file to be analyzed in input windows 34, 36, and 38. If only one log file is to be analyzed, the user selects the log file in input window 34. If more than one log file is to be analyzed, the first log file is selected in input window 34, the second log file is selected in input window 36, and the third log file is selected in input window 38. When selecting the log files to be analyzed, the user may also want to select the location to save the output file which can be done in output window 40.

Once the log files to be analyzed have been selected, the user presses process button 42 and analysis system 10 begins to automatically analyze the performance contained in the log file. At step 114, analysis system 10 selects the first performance data set in the log file to analyze. Analysis system 10 selects the performance data set to analyze by selecting the first the performance data set in the log file. A performance data set is the recorded data and information regarding one specific participant and one specific task for that participant. Generally in a IVR test, a participant is given four different tasks to accomplish such as "order DSL service" or "change your billing address." For example, a performance data set would contain the recorded information for participant A and the task of ordering DSL service.

Figure 3:
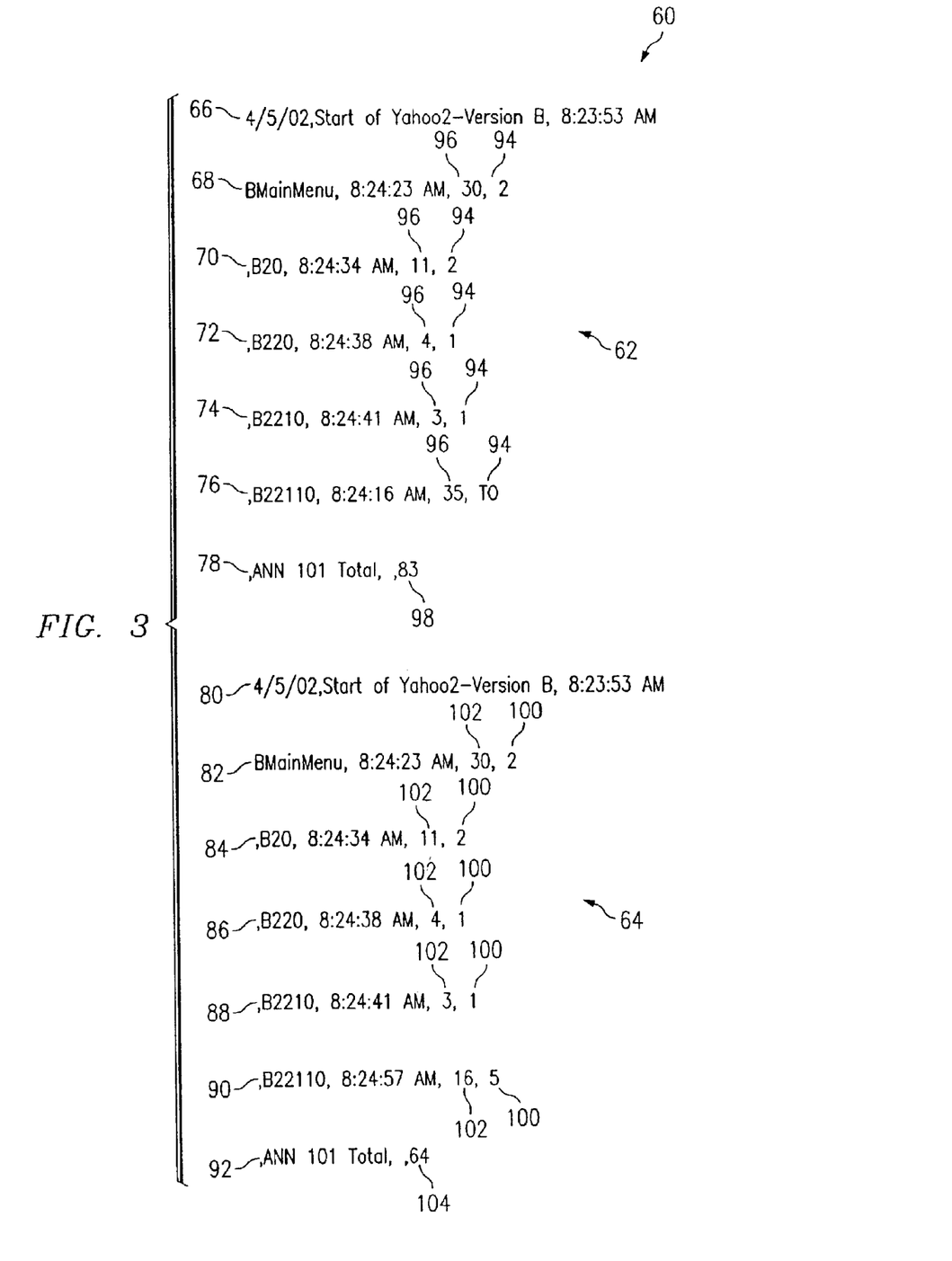
FIG. 3 depicts an example log file including performance data.

An example log file 60 including two example performance data sets 62 and 64 is shown in FIG. 3. A performance data set includes such information as the start time of the task, each menu accessed by the participant within the IVR, the time each menu was accessed, how long the participant listened to each menu, the key the participant pressed in response to the menu, and the total time the participant interacted with the IVR system.

Performance data sets are separated in a log file by start lines and end lines. Performance data set 62 includes start line 66 and end line 78 while performance data set 64 includes start line 80 and end line 92. Start lines 66 and 80 include the date of the IVR test, what IVR system is being tested, and the time that the first IVR menu begins to play. In start line 66, the date of the test is Apr. 5, 2002, the IVR system being tested is Yahoo2—Version B, and the first menu began playing at 8:23:53 AM. End lines 78 and 92 include total listening time 98 and 104 which is the total time that the participant spends listening to the menus and interacting with the IVR system. Performance data set 62 has total listening time 98 of 83 seconds and performance data set 64 has total listening time 104 of 64 seconds. Each line in-between start lines 66 and 80 and end lines 78 and 92 provides information regarding various submenus within the IVR accessed by the participant. For performance data set 62 and line 68, BMainMenu was accessed at 8:23:53 AM, the participant listed to BMainMenu for 30 seconds (listening time 96), pressed the "2" key (key 94), and BMainMenu stopped playing at 8:24:23 AM. Lines 70, 72, 74, and 76 supply the same type of information for each respective menu. Key 94 in line 76 is "TO" which indicates that the participant never made a selection in response to the "B22110" menu and therefore the participant was timed out of the menu.

Once analysis system 10 has selected the performance data set to be analyzed, task engine 30 determines a task code and task for the selected data set at step 116. The performance data sets do not contain a participant number identifying the participant or the task. But the participant number is stored in database 20 in a log-in call record file. When the participants access the IVR simulation application, analysis system 10 stores in database 20 each participant's participant number and the tasks they are to accomplish. Participants are generally given more than one task to accomplish and the participants are to attempt the tasks in a pre-specified order and the log files reflect this specified order of tasks. For example, if each participant is given four tasks to accomplish, then the log file includes four performance data sets for each participant where the four performance data sets for each participant are grouped together in the same sequence as the participant attempted each task. So if participant A was given the four tasks of "order DSL service," "change your billing address," "inquire about a bill payment," and "add call-forwarding," the log file has the four performance data sets for participant A one after the other in the same order as participant A was specified to attempt the tasks. Therefore, task engine 30 locates the participant number in database 20, determines what tasks the participant was supposed to accomplish and the order the tasks were to be accomplished, and determines which performance data sets correlate with which participants and tasks.

After task engine 30 determines the correct task for the selected performance data set, at step 118 task engine 30 retrieves from database 20 the correct key sequence for the corresponding task for the selected performance data set. Each task has a distinct correct key sequence so that for example that correct key sequence for "ordering DSL service" is different from the correct key sequence for "changing your billing address." The correct key sequence is the keys pressed in response to the IVR menu prompts that allows the participant to navigate the IVR menus and successfully accomplish the assigned task. For instance, the task of "ordering DSL service" requires the participant to navigate through and listen to three different menus in order to order DSL service. After the first menu, the participant needs to press the "3" key which sends the participant to the second menu. After the second menu the participant needs to press the "2" key which sends the participant to the third menu. After the third menu the participant needs to press the "4" key after which the participant has ordered DSL service and successfully completed the task. Therefore the correct key sequence for the task of "order DSL service" is "3, 2, 4."

At step 120, score engine 32, having the correct key sequence from task engine 30, searches the selected performance data set for the correct key sequence. Score engine 32 searches the last few keys 100 for the correct data sequence. Score engine 32 starts with the line right above end line 92 and begins searching up the lines 90, 88, 86, 84, and 82 to start line 80 looking for the correct key sequence. Score engine 32 examines the end of the selected performance data set because that is the only location where the correct key sequence may be located because when the participant enters the correct key sequence, the task is accomplished, the performance data set ends, and the participant moves on to the next assigned task. Therefore once the participant enters the last key of the correct key sequence, the next line in the performance data set is end line 92 and a new performance data set begins.

Score engine 32 compares the recorded key sequence entered by the participant with the correct key sequence at step 122. For example, performance data set 64 is for the task of "changing your billing address" and the task has a correct key sequence of "2, 2, 1, 1, 5." Score engine 32 compares the correct key sequence with the recorded key sequence in performance data set 64 beginning with line 88 which has "5" as key 100. Score engine 32 then moves up to line 86 to look for "1" as key 100 and finds "1" as key 100. Score engine 32 repeats this process for lines 86, 84, and 82 until a line does not have the correct key 100 or until score engine 32 determines that the recorded key sequence of performance data set 64 is the same as the correct key sequence.

Once score engine 32 compares the correct key sequence with the recorded key sequence for the selected performance data set at step 122, at step 124 score engine 32 determines if the task for the selected performance data set was successfully accomplished. The task is successfully accomplished if the recorded key sequence includes the correct key sequence. The task is not successfully accomplished or is a failure if the recorded key sequence does not include the correct key sequence. If the task is not accomplished, then at step 126 score engine 32 marks the selected performance data set as a failure. If the task is successfully accomplished, then at step 128 score engine 32 marks the selected performance data set as a success or as passing. For example, performance data set 62 timed out ("TO") in line 76 because the participant made no selection and therefore performance data set 62 cannot have the correct key sequence and score engine 32 marks performance data set 62 as failing. Determining whether the selected performance data set accomplished the task allows for an objective performance measure and provides a call-routing accuracy.

In addition to call-routing accuracy, analysis system 10 also provides for another objective performance measure—the amount of time the participant listens to each IVR menu and the total amount spent attempting to accomplish or accomplishing the assigned task. The amount of time the participant spends listening to the menu is not a very valuable number unless menu duration times are also taken into account. A menu duration time is the amount of time it takes for a menu to play in its entirety. For instance, a menu may have five different options to choose from and the menu duration time is the amount of time it takes for the menu to play through all five options.

At step 130, score engine 32 obtains the menu duration time from database 20 for the first menu in the selected performance data set. Score engine 32 also obtains the listening time for the first menu in the selected performance data set. The listening time is the time a participant actually spends listening to a menu before making a selection. For instance, performance data set 64 contains the first menu BMainMenu that has listening time 102 of 30 seconds (line 82). From database 20, score engine 32 retrieves that menu BMainMenu has a menu duration time of 30 seconds.

Once score engine 32 obtains both the listening time and the menu duration time, score engine 32 calculates the response time or the cumulative response time (CRT) for the first menu at step 132. The response time is the difference between the menu duration time and the listening time. Score engine 32 calculates the response time by subtracting the menu duration time from the listening time. For example, if the main menu of the IVR is 20 seconds in length, and the participant listens to the whole menu and then makes a selection, the participant has a listening time of 20 seconds and receive a CRT score or response time of 0 (20−20=0). If the participant only listens to part of a menu, hears their choice and chooses an option before the whole menu plays, then the participant receives a negative CRT score or response time. For instance, if the participant chooses option three 15 seconds (listening time) into a four-option, 20 second menu, the participant receives a CRT score or response time of "−5" (15−20=−5). Conversely, the participant has a response time of +15 if the participant were to repeat the menu after hearing it once, and then choose option three 15 seconds (35 second listening time) into the second playing of the menu (35−20=15). For performance data set 64 and line 82, the participant has a response time or CRT score of 0 because the participant has a listening time of 30 seconds and the BMainMenu menu has a menu duration time of 30 seconds (30−30=30).

After the calculation of the response time for the first menu, score engine 32 at step 134 determines if the selected performance data set has additional menus for which a response time needs to be calculated. If there are additional menus within the selected performance data set at step 134, then at step 136 score engine 32 obtains the menu duration time from database 20 for the next menu and the listening time for the next menu in the same manner as score engine 32 obtained the menu duration time and listening time for the first menu at step 130. So for performance data set 64, score engine 32 obtains the menu duration time and listening time for line 84 and menu "B20." Once score engine 32 obtains the menu duration time and the listening time for the next menu, at step 138 score engine 32 calculates the response time for the next menu in the same manner as described above at step 132. The method then returns to step 134 where score engine 32 determines if the selected performance data set has additional menus that have not yet been analyzed. Steps 134, 136, and 138 repeat until there are no additional menus to be analyzed within the selected performance data.

If there are no additional menus within the selected performance data set at step 134, then at step 140 score engine 32 calculates the total response time for the selected performance data set. The total response time is the difference between the total menu duration time and the total listening time. Score engine 32 calculates the total response time by first summing the menu duration times and the listening times for each menu within the selected performance data set. Once score engine 32 has both a total menu duration time and a total listening time, score engine 32 calculates the total response time for the selected performance data set by subtracting the total menu duration time from the total listening time. A negative total response time indicates that less time was used than required to accomplish the task, a zero response time indicates that the exact amount of time was used by the participant to accomplish the task, and a positive response time indicates that more time was used than required to accomplish the task. For instance, performance data set 64 has a total listening time 104 of 64 seconds and a total menu duration time of 75 seconds. Therefore, performance data set 64 has a total response time of −11 seconds (64−75=−11).

Once score engine 32 calculates the total response time for the selected performance data set, at step 142 analysis system 10 determines if there are additional performance data sets within the log file to be analyzed. If at step 142 there are additional performance data sets, then analysis system 10 selects the next performance data set at step 144 and the method returns to step 116 and repeats as described above until there are no additional performance data sets in the log file or files to be analyzed at step 142.

When there are no additional performance data sets to be analyzed at step 142, analysis system 10 and score engine 32 generate an output file at step 146 and the method ends at step 148. The output file is similar in structure to the log file and performance data and is sorted by participant and sequence of task. The output file includes all the information in the log file as well as additional information such as the participant number, the assigned task, the IVR system used by the participant, the response time for each menu, the total response time, and whether the task was successfully accomplished. The output file may also contain the correct key sequence for each performance data set. The output file allows a user of analysis system 10 to determine which IVR menu and tasks may need to be redesigned based on high positive response times or failures to accomplish tasks. For example, a performance data set for a particular task that was successfully accomplished but has very high response times may indicate that the menus need to be redesigned or reworded because although the participants accomplished the task, they had to listen to the menus several times before being able to make a selection.

In addition to the output file, GUI 28 has an additional feature that allows a user of analysis system 10 to quickly determine the reliability of IVR test results. Summary window 44 allows the user to quickly determine the pass/fail results for task accomplishment for each participant. Because participants may not take the IVR test seriously and others may only be taking the test to be paid, not all of the participants actually attempt to accomplish any of the assigned tasks. A participant intentionally failing all assigned tasks is not good for the overall test results and affects the analysis of the IVR system. A participant failing all of their assigned tasks is a good indication that the participant did not really try and that the associated performance data should be ignored when analyzing the output file. Summary window 44 allows the user to quickly peruse each participant's pass/fail results and call-routing accuracy without having to examine the output file and therefore determine which performance data should be disregarded and which tasks need to be tested again.

The call-routing and response time results of the IVR usability test yield important information that can be used in the further development and refinement of IVR systems. Based on these measures, companies can select IVR designs associated with the best objective performance and usability score and have an IVR system that is efficient and satisfactory to the customers.

Although the present invention has been described in detail, it should be understood that various changes, substitutions and alterations can be made hereto without the parting from the spirit and scope of the invention as defined by the appended claims.

What is claimed is:

1. A method for the automated analysis of interactive voice response system performance data, the method comprising:

determining a task for a performance data set;

retrieving a correct key sequence for the task;

searching for the correct key sequence at the end of the performance data set;

automatically comparing the correct key sequence for the task with a recorded key sequence of the performance data set;

determining if the task was successfully completed based on the comparison of the correct key sequence and the recorded key sequence based on the recorded key sequence corresponding with the correct key sequence;

scoring the performance data set as successful or unsuccessful;

obtaining one or more menu duration times;

automatically calculating one or more response times for one or more menus by subtracting the menu duration time from a listening time for each menu;

calculating a total response time for the performance data set; and generating an output file sorted by a participant number and by a task number.

2. The method of claim 1 wherein determining a task for the performance data set comprises matching a participant number of the performance data set and a sequence number of the performance data set to one of a plurality of tasks in a database.

3. A method for the automated analysis of performance data, the method comprising:

determining a task for a performance data set;

retrieving a correct key sequence for the task;

automatically comparing the correct key sequence for the task with a recorded key sequence of the performance data set; and automatically calculating one or more response times associated with performance of the correct key sequence.

4. The method of claim 3 wherein calculating one or more response times comprises calculating a response time for an individual menu.

5. The method of claim 3 wherein calculating one or more response times comprises calculating a total response time for the performance data set.

6. The method of claim 3 wherein calculating the response time comprises obtaining one or more menu duration times.

7. The method of claim 3 wherein determining a task for the performance data set comprises matching a participant number of the performance data set and a sequence number of the performance data set to one of a plurality of tasks in a database.

8. The method of claim 3 wherein comparing the correct key sequence with a recorded key sequence comprises determining the task is successfully completed if the recorded key sequence corresponds with the correct key sequence.

9. The method of claim 3 wherein comparing the correct key sequence with a recorded key sequence comprises searching for the correct key sequence at the end of the performance data set.

10. The method of claim 3 further comprising generating an output file.

11. The method of claim 10 wherein generating the output file comprises sorting the output file by a participant number and by the order in which a participant performed the task.

12. Software for the automated analysis of performance data, the software embodied in a computer-readable medium and operable to:
   determine a task for a performance data set;
   retrieve a correct key sequence for the task;
   automatically compare the correct key sequence for the task with a recorded key sequence of the performance data set; and
   automatically calculate one or more response times associated with performance of the correct key sequence.

13. The software of claim 12 wherein calculating one or more response times comprises calculating a response time for one or more menus.

14. The software of claim 12 wherein calculating one or more response times comprises calculating a total response time for the performance data set.

15. The software of claim 12 wherein calculating the response time comprises obtaining one or more menu duration times.

16. The software of claim 12 wherein determining a task for the performance data set comprises matching a participant number of the performance data set and a sequence number of the performance data set to one of a plurality of tasks in a database.

17. The software of claim 12 wherein comparing the correct key sequence with a recorded key sequence comprises determining the task is successfully completed if the recorded key sequence corresponds with the correct key sequence.

18. The software of claim 12 wherein comparing the correct key sequence with a recorded key sequence comprises searching for the correct key sequence at the end of the performance data set.

19. The software of claim 12 further operable to generate an output file sorted by a participant number and by the order in which a participant performed the task.

20. A system for the automated analysis of performance data, the system comprising:
   a plurality of performance data sets;
   a task engine operable to determine a task for each performance data set and retrieve a correct key sequence for each task; and
   a score engine associated with the task engine, the score engine operable to compare the correct key sequence for the task with a recorded key sequence of the performance data set and calculate one or more response times associated with performance of the correct key sequence.

21. The system of claim 20 wherein the score engine calculates a response time for one or more menus.

22. The system of claim 20 wherein the score engine calculates a total response time for each performance data set.

23. The system of claim 20 wherein the score engine obtains one or more menu duration times.

24. The system of claim 20 wherein the score engine subtracts a menu duration time from a listening time in order to calculate the response time.

25. The system of claim 20 wherein the task engine matches a participant number of the performance data set and a sequence number of the performance data set to one of a plurality of tasks in a database.

26. The system of claim 20 wherein the score engine is further operable to determine if the task was successfully completed based on the recorded key sequence corresponding with the correct key sequence.

27. The system of claim 20 wherein the score engine is further operable to generate an output file.

28. The system of claim 20 wherein the tasks comprise a plurality of simulated interactions with an interactive voice response system.

29. The system of claim 20 further comprising a graphical user interface associated with the task engine and the score engine, the graphical user interface having a summary window and operable to allow for the selection of the performance data set to be analyzed.

30. A method for the automated analysis of performance data, the method comprising;
   determining a task for a performance data set;
   retrieving a correct key sequence for the task;
   automatically comparing the correct key sequence for the task with a recorded key sequence of the performance data set; and
   automatically calculating one or more response times, wherein calculating the response time comprises obtaining one or more menu duration times and subtracting the menu duration time from a listening time.

31. Software for the automated analysis of performance data, the software embodied in a computer-readable medium and operable to:
   determine a task for a performance data set;
   retrieve a correct key sequence for the task;
   automatically compare the correct key sequence for the task with a recorded key sequence of the performance data set; and
   automatically calculate one or more response times, wherein calculating the response time comprises obtaining one or more menu duration times and subtracting the menu duration time from a listening time.

32. A system for the automated analysis of performance data, the system comprising:
   a plurality of performance data sets;
   a task engine operable to determine a task for each performance data set and retrieve a correct key sequence for each task; and
   a score engine associated with the task engine, the score engine operable to compare the correct key sequence for the task with a recorded key sequence of the performance data set and calculate one or more response times, wherein the score engine obtains one or more menu duration times and subtracts the one or more menu duration times from a listening time in order to calculate the response time.

33. The method of claim 30 wherein calculating one or more response times comprises calculating a response time for an individual menu.

34. The method of claim 30 wherein calculating one or more response times comprises calculating a total response time for the performance data set.

35. The method of claim 30 wherein determining a task for the performance data set comprises matching a participant number of the performance data set and a sequence number of the performance data set to one of a plurality of tasks in a database.

36. The software of claim 31 wherein calculating one or more response times comprises calculating a response time for an individual menu.

37. The software of claim 31 wherein calculating one or more response times comprises calculating a total response time for the performance data set.

38. The software of claim 31 wherein determining a task for the performance data set comprises matching a participant number of the performance data set and a sequence number of the performance data set to one of a plurality of tasks in a database.

39. The system of claim 32 wherein the score engine is operable to calculate a response time for an individual menu.

40. The system of claim 32 wherein the score engine is operable to calculate a total response time for respective performance data sets.

41. The system of claim 32 wherein the task engine is operable to match a participant number of the performance data set and a sequence number of the performance data set to one of a plurality of tasks in a database.

* * * * *